United States Patent [19]

Hyler et al.

[11] 3,927,759

[45] Dec. 23, 1975

[54] FLIGHT ASSEMBLY FOR ACHIEVING BALANCED REACTION FORCES IN ELEVATING-TYPE SCRAPER

[75] Inventors: John H. Hyler; Clifford E. Johnson, both of Peoria, Ill.

[73] Assignee: Westinghouse Air Brake Company, Pittsburgh, Pa.

[22] Filed: July 15, 1974

[21] Appl. No.: 488,523

[52] U.S. Cl. ............... 198/171; 198/175; 198/172
[51] Int. Cl.² ........................................ B65G 19/00
[58] Field of Search ........... 198/175, 171, 172, 173, 198/189, 204, 109, 195, 23, DIG. 18, 208, 168, 169, 170, 151

[56] References Cited
UNITED STATES PATENTS

| | | | |
|---|---|---|---|
| 729,296 | 5/1903 | Edgerton | 198/195 |
| 1,422,151 | 7/1922 | Walker | 198/151 |
| 1,527,146 | 2/1925 | Litchfield et al. | 198/195 |
| 2,391,700 | 12/1945 | Hapman | 198/170 |
| 2,667,263 | 1/1954 | Bigler et al. | 198/171 |
| 3,522,875 | 8/1970 | Smerd et al. | 198/175 |

FOREIGN PATENTS OR APPLICATIONS

| | | | |
|---|---|---|---|
| 226,462 | 3/1963 | Austria | 198/168 |
| 796,812 | 6/1958 | United Kingdom | 198/171 |

Primary Examiner—Richard A. Schacher
Assistant Examiner—James M. Slattery
Attorney, Agent, or Firm—Wolfe, Hubbard, Leydig, Voit & Osann, Ltd.

[57] ABSTRACT

A chain and flight assembly for use in an elevator in an earth-moving machine including a pair of endless chains having successions of paired outer links and inner links which are moved in unison along parallel runs. Corresponding links in the chains are formed to provide aligned flat platforms. A flight extending between the chains has bases at its ends presenting aligned flat surfaces which are dimensioned to mate with the platforms. The platforms have pivot connections which are oriented perpendicularly to the runs of the chains for pivotally securing the bases of the flight so that when the flight is bowed by striking an obstruction, relative twisting movement may take place between the bases and the platforms on the links to avoid transmission to the links of twisting stress from the flight. In the preferred embodiment of the invention, the outer links provide an integrated platform and each platform has a retainer cap which is secured to the platform by bolts. The retainer cap has a cylindrical embossment which is fitted into a circular opening in the flight base to provide the pivot connection. Oversized clearance openings are formed in the flight base for passing the bolts and for accommodating the twisting movement of the base. In an alternative embodiment paired inner links of block shape are modified to form platforms having pivot connections with the flight bases.

5 Claims, 9 Drawing Figures

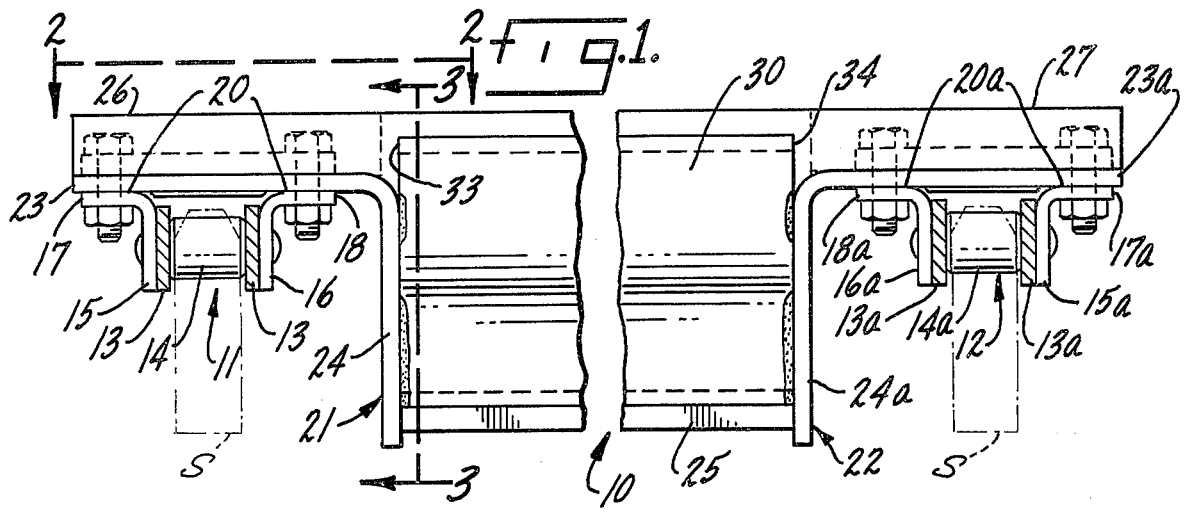
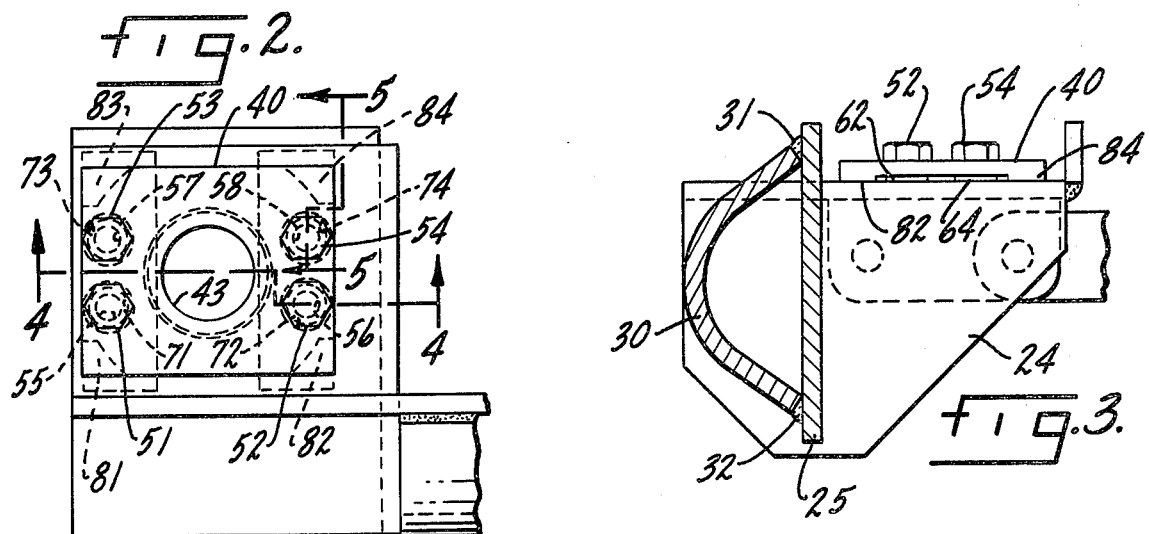
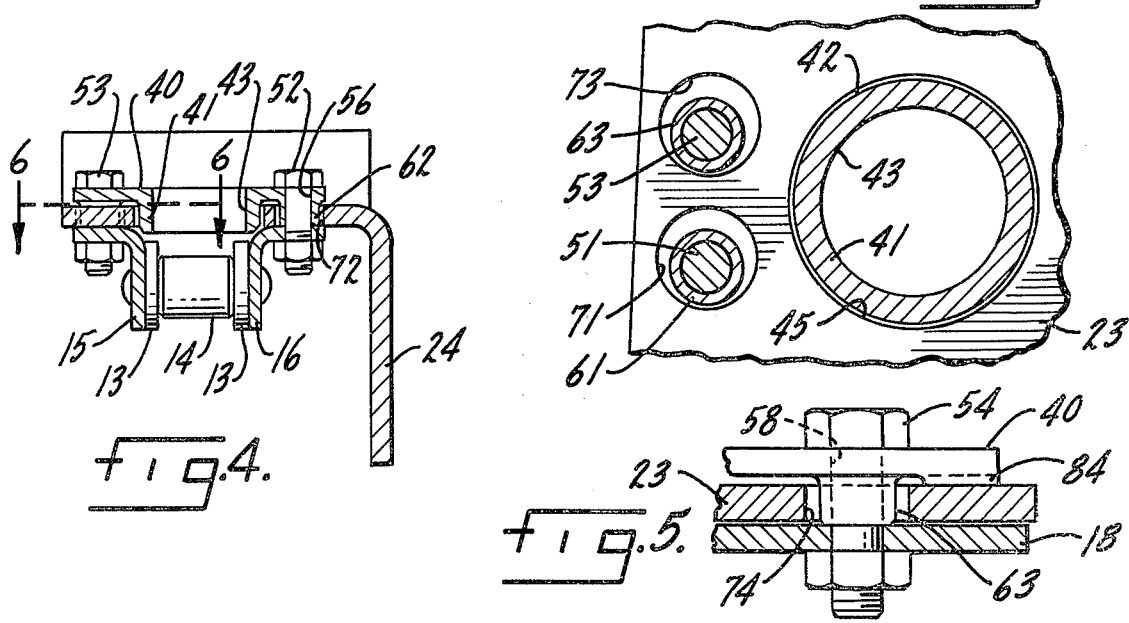

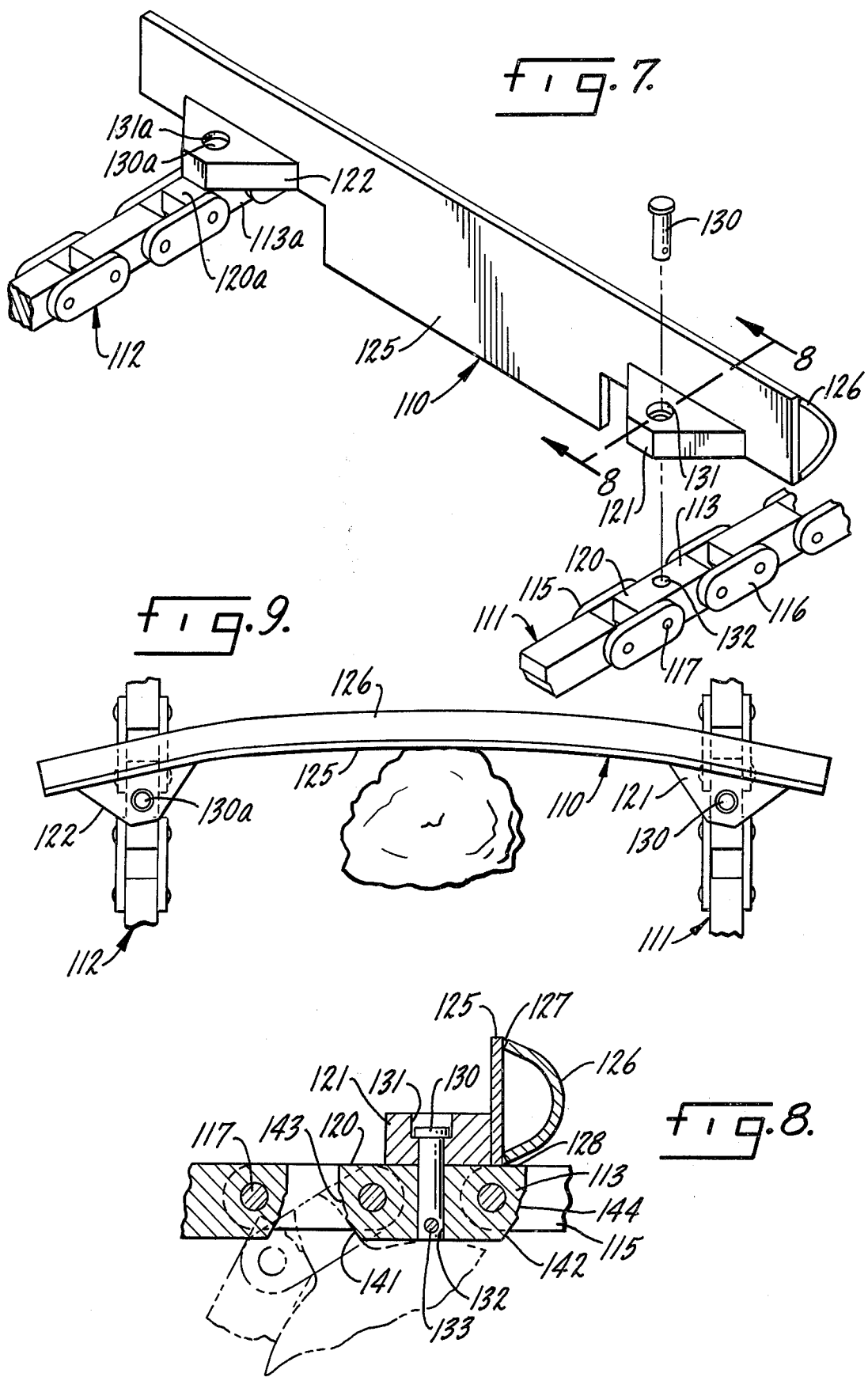

3,927,759

FLIGHT ASSEMBLY FOR ACHIEVING BALANCED REACTION FORCES IN ELEVATING-TYPE SCRAPER

BACKGROUND OF THE INVENTION

The invention relates generally to an elevator which forms a part of a tractor drawn scraper, the elevator conventionally including a pair of chains having successions of paired links to which the ends of the transversely extending flights are solidly bolted.

As the scraper encounters boulders and other obstructions which are engaged by an elevator flight, high peak loads are applied to the flight causing it to deform by bowing. Such bowing applies a twisting couple to the portions of each chain to which the flight is secured. Not only does the twisting apply an unbalanced load to the chain, but the forces in the twisting couple are additive to the design tension forces to produce a condition of peak loading which may greatly exceed such tension forces to produce premature chain failure. Where the flight, by reason of being stressed beyond the elastic limit, acquires a "set" in the bowed condition, an unbalance load is thereafter constantly applied to the links to which the flight is secured so that such links are subject thereafter to overstress even during design operating conditions. Because of the constant "working" of the twisting forces upon the chain, the bolts which secure the flight to the chain are subject to failure and loosening. The effect of the above is to produce aggravated wear, and to set the stage for catastrophic failure upon striking a severe obstruction, requiring replacement of the chain in only a fraction of the time that the chain is designed to last.

SUMMARY OF THE INVENTION

It is accordingly an object of the present invention to provide an elevator flight and chain construction which avoids rigid securing of the flights to the chain links and which instead provides aligned, flat platforms on a pair of links for receiving aligned, flat base surfaces at the ends of a flight, the platforms having respective pivot connections with the flight bases on axes oriented perpendicularly to the runs of the chains so that when the flight is bowed by striking the obstruction, the bowing is accommodated by twisting movement at the pivot connections thereby to avoid application of unbalanced twisting forces to the links.

It is an object of the invention to provide an elevator having a pair of parallel chains, the elements of which are at all times loaded evenly, free of any unbalance caused by application of a twisting couple from the flight to the chain as the flight bows upon engagement with the dirt or upon striking of an obstruction.

It is a more specific object to transmit all load stress from a flight to a point which is mid-way between the sides of the chain and which acts upon the side elemennts in the same direction and to equal degree.

It is a general object to provide a chain and flight assembly which, because of its being limited to balanced load forces, may be more lightly constructed while nevertheless achieving a longer useful life than has been obtainable in elevators of conventional construction.

BRIEF DESCRIPTION OF THE DRAWINGS

FIG. 1 is a back view of a flight showing the mounting thereof on paired outer links in a pair of parallel chains of the roller type;

FIG. 2 is a view looking perpendicularly to the run of the chain and taken along the line 2—2 in FIG. 1;

FIG. 3 is a cross-section taken transversely through the flight looking along the line 3—3 in FIG. 1;

FIG. 4 is a broken section looking along the line 4—4 in FIG. 2;

FIG. 5 is a fragmentary section looking along the line 5—5 in FIG. 2;

FIG. 6 is a section taken along the surface of the flight base and looking along line 6—6 in FIG. 4, to show accommodation of skewing movement resulting from bowing;

FIG. 7 is an exploded perspective showing an alternate form of the invention;

FIG. 8 is a section looking along line 8—8 in FIG. 7; and

FIG. 9 is a diagram showing bowing of the flight (greatly exaggerated).

While the invention has been described in connection with certain preferred embodiments, it will be understood that I do not intend to limit the invention to the particular embodiments shown but intend, on the contrary, to cover the various alternative and equivalent forms of the invention which may be included within the spirit and scope of the appended claims.

DETAILED DESCRIPTION OF THE PREFERRED EMBODIMENT

Referring now to the drawings there is shown a flight 10 mounted upon chains 11, 12 trained about drive sprockets S. Taking chain 11 as typical it includes an inner link 13, rollers 14 and an outer link made up of link members 15, 16. The latter are not conventional outer link members but include integral flanges 17, 18 which, taken together, define a flat platform 20. In the other chain 12, which is arranged parallel to the first, similar elements are indicated by similar reference numerals with addition of the subscript $a$, the result being to provide a flat platform 20a which is in alignment with the platform 20.

Seated upon the respective platforms are base members 21, 22. Taking the base member 21 by way of example, it is formed of a plate of metal centrally bent to provide a flat base 23 which seats upon the platform 20 and an inwardly facing portion 24, which serves as a mounting surface. The opposite base member, similarly, has a base 23a and inwardly facing portion 24a.

Between the portions 24, 24a is mounted a flight plate 25 which is notched out in the corner positions to define wings 26, 27. The ends of the flight plate and the wing portions thereof are welded to the perpendicularly related portions of the base members 21, 22 as indicated. For the purpose of reinforcing the flight plate 25 a back-up plate 30 is provided which is bent into C-shape and welded to the back surface of the flight plate along its edges 31, 32 as well as at the ends 33, 34 to form a box-like, highly rigid structure.

For the purpose of providing a pivoted connection between the platforms 20, 20a and the bases 23, 23a of the flight, it is preferred to use a retainer cap having a cylindrical embossment on the underside and which serves as a bridge between the two flanges 17, 18 which define the supporting platform. The retainer cap indicated at 40 is in the present instance of rectangular configuration as shown in FIG. 2, dimensioned to correspond with the dimensions of the platform 20. The retainer cap has a cylindrical embossment 41 (FIGS. 4 and 6) which extends downwardly presenting an outer cylindrical surface 42. The embossment is centrally penetrated by a large circular opening 43. For mating with the embossment a fitted hole 45 is provided at the center of the flight base 23. The embossment 41 serves as a pivot pin of large diameter presenting a large bearing area to the opening in the flight base and permitting twisting of the flight base relative to the chain links without transmission of any twisting couple to the links.

For the purpose of securing the retainer cap to the flanges 17, 18 of the outer link, which define the platform 20, bolts 51–54 are used which are fitted in receiving openings 55–58 in the cap arranged in a two-dimensional pattern and which engage registering mounting holes in the flanges. In order to be able to clamp the retainer cap 40 tightly to the chain flanges 17, 18 while permitting free shifting movement of the flight base, the retainer cap is provided with integral bushings 61–64 (see for example 63 in FIG. 5) surrounding the bolts 51–54, with the bushings being of a length which exceeds the thickness of the flight base. The bushings are received in oversized clearance holes 71–74. In order to insure against looseness between the retainer cap and the flight base integral pads 81, 84 are provided at the corners of the retainer cap. The pads are of such thickness as to bear only lightly against the flight base to permit twisting while nevertheless keeping the flight base firmly seated upon the platform 20.

The function of the structure in the face of twisting movement, brought about by bowing of the flight, is illustrated in FIG. 6 where the nature of the shift of the clearance openings 71–74 with respect to the bushings 61–64 will be apparent. The clearance is sufficient so that bottoming never occurs between the bushings and the clearance openings. The embossment as stated serves as a large diameter pivot pin. Because of the large amount of peripheral area provided by the outer surface 42 of the embossment, and the fit which exists between the embossment and the opening in the flight base, high peak forces can be safely transmitted from the flight base. And since the center of twisting movement is centered with respect to the platform 20 defined by the chain, reaction forces are at all times equally divided between the links at the two sides of the chain. There is no possibility of a twisting couple being set up to provide twisting forces which would be additively applied to one side of the chain but not to the other as is common in conventional constructions. The action at the other end of the flight is a mirror image of that just discussed.

The clearance around the bushings, it may be noted, is protected by the cap against entry of foreign material so that the accommodation of the twisting movement is not impaired by passage of time or by hard usage.

DETAILED DESCRIPTION OF ALTERNATE EMBODIMENT

While the construction described above employs especially shaped outer links to provide a pair of aligned, flat, platforms for mounting of the flight bases for accommodation of relative twisting movement, the present invention also contemplates utilizing specially shaped inner links to serve as flight mounting platforms with the same twisting accommodation. Referring to FIG. 7 the flight, indicated at 110 is mounted upon chains 111 and 112. The chains have inner links 113 and outer links 115, 116 interconnected by suitable pins 117. Selected inner links define a platform 120. A similar platform 120a is provided upon the paired link 113a in the opposite chain, two platforms being aligned, that is, coplanar, with one another. Secured to the respective ends of the flight 110 are flight bases 121, 122 which serve as mounting brackets and which extend at right angles to the face of the flight.

The central portion of the flight is made up of a flight plate 125. For purposes of reinforcing the flight plate a reinforcing plate 126 is used which is, as shown, bent into C-formation and which is welded to the flight plate along upper and lower edges 127, 128 respectively. For the purpose of individually pivoting the flight base 121 upon the platform 120 of link 113 for twisting movement about an axis perpendicular to the run of chain, a pivot pin 130 is used which is fitted into a bore 131 and the shank of which is received in an opening 132 in the link 113 where it is held in place by a cross-pin 133. Similarly, at the opposite end of the flight, a pin 130a passes through a receiving opening 131a in the flight base 122, with the tip of the pin being received in the inner link 113a.

For fitting the inner links 113 between the teeth of a sprocket wheel, each link 113 is preferably formed as shown in profile in FIG. 8. Here it will be noted that the link 113 is of rounded and inverted trapezoidal shape having bearing surfaces 141, 142 at the respective ends defined by adjacent reliefs 143, 144. The surfaces 141, 142 thus perform the bearing function usually performed by rollers of a typical roller chain but such bearing surfaces, unlike roller surfaces, are contoured to follow the surface of the sprocket tooth so that "area" contact between the link and tooth rather than simple "line" contact is achieved. This combined with the relative massiveness of the inner link construction enables quieter operation, freedom from maintenance expense, and long useful life.

A typical bowing situation is illustrated in FIG. 9, showing encountering of a large rock, but with the curvature exaggerated to show the nature of the twisting action. Because of the lack of any rigid connection between the flight bases and the link platforms on which they are seated, it is apparent that there is no possibility of transmitting a force couple between the flight and link. Moreover, since the pivot pins 130, 130a are centered with respect to the link platforms which they engage, the flight reaction forces are evenly divided between the outside links of the chain insuring balanced forces which do not exceed design levels. Accordingly the chain may be of lighter construction than conventional chain while still achieving a long and trouble-free life. It will be apparent also that the chain consisting of a collection of inner and outer block links is of highly simplified and economical construction. In this embodiment the inner, block-like links 113 have a sufficient area so that no auxiliary flanges are required to provide a supporting platform upon which the flight bases may be seated, resulting in a construction which performs the desired function with a minimum number of parts.

The term "flight having bases at its ends" is intended to cover any flight having supporting surfaces either at or near the ends thereof.

We claim as our invention:

1. In an elevator for use in an earth moving machine, the combination comprising a pair of endless chains, means for supporting and driving the chains for movement in unison along parallel runs, the chains having respectively paired outer and inner links, at least one pair of such links having means defining aligned, flat platforms parallel to the runs of the chains, a transversely extending flight having bases at its ends in the form of end plates presenting aligned, flat surfaces dimensioned to mate with the platforms for seating thereon, pivot connections on the platforms generally centered thereon and oriented perpendicularly to the runs of the chains for pivotally securing the bases of the flight, a plurality of fasteners in the form of bolts in a two-dimensional pattern for maintaining the bases of the flight seated against the surfaces of the respective platforms, and means providing limited lateral lost motion at the bolts so that when the flight is bowed by striking an obstruction setting up a peak reaction force, the bowing is accommodated by limited free twisting movement of the flight bases relative to the platforms thereby to avoid twisting of the links and insuring equal division of the reaction force between the links of the chains.

2. In an elevator for use in an earth moving machine, the combination comprising a pair of endless chains, means for supporting and driving the chains for movement in unison along parallel runs, the chains having respectively paired outer and inner links, at least one pair of such links being formed to provide aligned, flat platforms parallel to the runs of the chains, a transversely extending flight having bases at its ends presenting aligned, flat surfaces dimensioned to mate with the platforms for seating thereon, cap members superimposed upon the bases of the flights and each having in the central portion thereof an inwardly extending circular embossment which is fittingly received in a hole formed in the adjacent flight base to form a pivot, each cap member being captively secured to its respective platform by bolts arranged about the embossment in a two-dimensional pattern and which extend through oversized clearance openings in the flight, thereby freely to accommodate the relative twisting which occurs when the flight is bowed by striking an obstruction setting up a peak reaction force and insuring equal division of the reaction force between the links of the chains.

3. The combination as claimed in claim 2 in which the embossment has a large central opening defining an annular wall which serves as a pivot pin of large diameter presenting a large bearing area to the wall of the registering hole in the flight base, the outer links each having a mounting portion and an outwardly bent supporting portion at right angles thereto, the supporting portions being co-planar to form a platform which has a through opening at its center, the openings in the embossment and in the platform being in alignment and providing a large through opening generally aligned with the chain.

4. In an elevator for use in an earth moving machine, the combination comprising a pair of endless chains, means for supporting and driving the chains for movement in unison along parallel runs, the chains having respectively paired outer and inner links, at least one pair of such links being formed to provide aligned, flat platforms parallel to the runs of the chains, a transversely extending flight having bases at its ends presenting aligned, flat surfaces dimensioned to mate with the platforms for seating thereon, cap members respectively superimposed upon the flight bases, each cap member having a central annular embossment on the underside closely fitted in a hole formed in the respective flight bases, each cap member having a plurality of bolt holes surrounding the central embossment for receiving bolts for clamping the cap member to the platform with the associated flight base sandwiched in between, the flight base having oversized clearance holes for passing the screws thereby freely to accommodate the relative twisting which occurs when the flight is bowed by striking an obstruction setting up a peak reaction force and insuring equal division of the reaction force between the links of the chains.

5. In an elevator for use in an earth moving machine, the combination comprising a pair of endless chains, means for supporting and driving the chains for movement in unison along parallel runs, the chains having respectively paired outer and inner links, at least one pair of such links being formed to provide aligned, flat platforms parallel to the runs of the chains, a transversely extending flight having bases welded to its respective ends, each base being in the form of a plate centrally bent at 90° to form bases lying in a plane and inwardly facing mounting surfaces, the transversely extending portion of the flight being welded at its ends to the respective mounting surfaces, each base having a large circular opening, each base having a retainer cap superimposed thereon, the retainer cap having a cylindrical embossment mating with the central opening, and means including bolts for securing the retainer cap to the platform with the flight base sandwiched in between, the flight base having oversized clearance holes for providing lateral clearance about the bolts thereby to permit relative twisting movement of each flight base relative to the platform upon which it is mounted so that the links are maintained free of twisting forces when the flight is bowed by striking an obstruction.

\* \* \* \* \*